(12) United States Patent
Kim

(10) Patent No.: US 6,339,622 B1
(45) Date of Patent: Jan. 15, 2002

(54) DATA TRANSMISSION DEVICE

(75) Inventor: Kuy Tae Kim, Kyungki-do (KR)

(73) Assignee: LG Semicon Co., Ltd., Chungcheongbuk-Do (KR)

( * ) Notice: Subject to any disclaimer, the term of this patent is extended or adjusted under 35 U.S.C. 154(b) by 0 days.

(21) Appl. No.: 09/146,958

(22) Filed: Sep. 4, 1998

(30) Foreign Application Priority Data

Oct. 29, 1997 (KR) .............................................. 97-56081

(51) Int. Cl.$^7$ ................................................ H04L 25/34
(52) U.S. Cl. .......................................... 375/287; 326/60
(58) Field of Search .............................. 375/211, 259, 375/286, 287, 290; 326/59, 60

(56) References Cited

U.S. PATENT DOCUMENTS

| | | | | |
|---|---|---|---|---|
| 3,798,544 A | * | 3/1974 | Norman | 375/211 |
| RE30,182 E | * | 12/1979 | Howson | 375/290 |
| 5,498,980 A | * | 3/1996 | Bowles | 326/60 |
| 5,539,333 A | | 7/1996 | Cao et al. | 326/63 |
| 5,633,631 A | * | 5/1997 | Teckman | 341/58 |
| 5,847,990 A | * | 12/1998 | Irrinki et al. | 365/154 |
| 5,880,683 A | * | 3/1999 | Brandestini | 341/10 |
| 6,038,260 A | * | 3/2000 | Emma et al. | 375/259 |
| 6,040,709 A | * | 3/2000 | Kishimoto | 326/59 |

OTHER PUBLICATIONS

Principles of CMOS VLSI Design—A Systems Perspective, Weste et al., pp. 61–69, Jun. 1988.

* cited by examiner

*Primary Examiner*—Stephen Chin
*Assistant Examiner*—Chieh M. Fan
(74) *Attorney, Agent, or Firm*—Morgan, Lewis & Bockius LLP

(57) ABSTRACT

A data transmission device which improves data transmission efficiency is disclosed. A data transmission device includes a decoder converting a first binary data to a ternary data, a ternary data generator coupled to the decoder and generating three logic levels corresponding to a power source voltage, an intermediate voltage, and a ground voltage, the intermediate voltage having a voltage level between the power source voltage and the ground voltage, a ternary data detector coupled to the ternary data generator and converting the three logic levels from the ternary data generator to pairs of second binary data, and an encoder coupled to the data detector and restoring the pairs of second binary data to the first binary data.

12 Claims, 9 Drawing Sheets

FIG.8

| input | voltage level | output ||
|---|---|---|---|
| | | out t1 | out t2 |
| L | 0~1 | H | H |
| C | 2~3 | L | H |
| H | 4~5 | L | L |

DATA TRANSMISSION DEVICE

This application claims the benefit of Korean Application No. 97-56081 filed Oct. 29, 1997, which is hereby incorporated by reference.

BACKGROUND OF THE INVENTION

1. Field of the Invention

The present invention relates to a device for a data communication, and more particularly, to a data transmission device. Although the present invention is suitable for a wide scope of applications, it is particularly suitable for improving data transmission efficiency without increasing a clock speed of devices.

2. Discussion of the Related Art

For a data transmission, binary data comprising a low level data and a high level data are transmitted at data levels of 0 V (low level)~5 V (high level). Since a clock signal determines an operation speed of computer, computer designers have made an effort to improve the operation speed of computer having a faster clock signal. Consequently, a logic of a CMOS transistor takes an important role in developing a faster data processing system. Operation of the CMOS transistor depends on a turn-on voltage of the device, which is a threshold voltage.

A data transmission device according to a background art will be described with reference to the accompanying drawings.

FIG. 1 is a circuit diagram illustrating a CMOS transistor according to the background art. As shown in FIG. 1, when an input voltage $V_{in}$ is greater than $V_{tp}+V_{DD}$ ($V_{tp}<0$), a PMOS PM is turned off and an NMOS NM is thus saturated. $V_{tp}$ represents a threshold voltage of the PMOS PM. An output voltage becomes a ground voltage $V_{ss}$ because only the NMOS NM is turned on.

Conversely, when the input voltage $V_{in}$ is smaller than the threshold voltage $V_{tn}$, the NMOS NM is turned off and the PMOS PM is saturated. As a result, only the PMOS PM is turned on. Therefore, the output voltage becomes a power source voltage, $V_{DD}$.

Both the PMOS PM and NMOS NM are in a non-saturated state when the input voltage $V_{in}$ is greater than the threshold voltage $V_{tn}$ of the NMOS NM and smaller than $V_{tp}+V_{DD}$. The voltage is determined at the position where a current of the PMOS PM becomes identical to that of the NMOS NM.

Consequently, when the input voltage is a high level, the output voltage becomes a low level. In contrast, when the input voltage is a low level, the output becomes a high level. As a result, only a binary data transmission is possible in the background art.

Another background art is disclosed in the U.S. Pat. No. 5,539,333 as shown in FIG. 2, which illustrates a circuit diagram of a low voltage differential clock signal (LVDS) having a driver circuit connected with a receiver circuit. The driver circuit inputs differential clock signals IN1 and IN2 and processes the signals for transmitting to the receiver circuit.

The driver circuit converts the differential clock signals IN1 and IN2 to low voltage differential signals. The signals are thus used in the other circuits of the data processing system, thereby transmitting the low voltage differential signals to the receiver circuit through output terminals OUT1 and OUT2. Both the driver circuit and the receiver circuit are realized by a CMOS technology.

A resistor $R_T$ of the receiver circuit is for matching a capacitance with an inductance of a transmission line 2 between the driver circuit and the receiver circuit.

The receiver circuit receives the low voltage differential signals from the driver circuit and converts the signals to the various frequencies to be used in the other circuits (not shown).

The conventional data transmission device generates a delay time by means of $\tau_{RC}$ when a voltage difference between transmission lines is large enough during the data transmission, whereas it restores a data by a differential amplifier using the voltage difference.

FIG. 3 is a waveform of two transmission data of FIG. 2. A signal having an 1 V difference with reference to 1.1 V is transmitted as shown in FIG. 3.

FIG. 4 is a block diagram illustrating a liquid crystal display (LCD) device adopting a data transmission device including a background art CMOS transistors. As shown in FIG. 4, the LCD device includes an LCD panel 41, a plurality of source drivers 43, a plurality of gate drivers 45, and an LCD controller 47. The source drivers 43 and the gate drivers 45 are disposed around the LCD panel 41. The LCD controller 47 controls the source drivers 43 and the gate drivers 45.

In the background art LCD device, the LCD controller 47 transmits a control signal to the gate drivers 45 and respective 6 or 8 bit data per each of R, G, B image signals to the source drivers 43. Therefore, when the 6 bit data is transmitted, total 18 bit data are outputted to the source drivers 43. Total 24 bit data are transmitted to the source drivers 43 in case that the 8 bit data is transmitted.

R, G, B data in two channels must be transmitted simultaneously as a resolution increases. As a result, 36 transmission lines to 48 transmission lines are required to transmit R, G, B data to the source drivers 43.

The aforementioned background art data transmission devices using in the LCD device have several problems as follows.

With an increased data transmission speed using the CMOS, increase in both a power consumption and an electromagnetic interference (EMI) is unavoidable.

Especially in LVDS, two transmission lines are required for a data transmission. Thus, to improve a transmission efficiency, the data transmission device must have a speed faster than a clock speed of a conventional CMOS. Further, there is no compatibility with any other conventional CMOS interface. Since a clock signal having a fast speed is required to receive a fast signal, a phase lock loop (PLL) is additionally required, thereby complicating a circuit configuration.

SUMMARY OF THE INVENTION

Accordingly, the present invention is directed to a data transmission device that substantially obviates one or more of the problems due to limitations and disadvantages of the related art.

An object of the present invention is to provide a data transmission device for a liquid crystal display device which improves a data transmission efficiency by converting a binary data to a ternary data.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a data transmission device according to the present invention includes a decoder for converting a binary data to a ternary data, a ternary data generator for generating three logic levels corresponding to a power source voltage, a ground voltage, and an intermediate voltage between the power source voltage and the ground voltage, a data detector for converting the three logic levels from the ternary data generator to pairs of binary data, and an encoder for restoring the pairs of binary data to binary data.

In another aspect of the present invention, a data transmission device includes a decoder converting a first binary data to a ternary data, a ternary data generator coupled to the decoder and generating three logic levels corresponding to a power source voltage, an intermediate voltage, and a ground voltage, the intermediate voltage having a voltage level between the power source voltage and the ground voltage, a ternary data detector coupled to the ternary data generator and converting the three logic levels from the ternary data generator to pairs of second binary data, and an encoder coupled to the data detector and restoring the pairs of second binary data to the first binary data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 8 is a logic table of the ternary data detector of FIG. 7 according to the present invention;

DETAILED DESCRIPTION OF THE PREFERRED EMBODIMENTS

Reference will now be made in detail to the preferred embodiments of the present invention, examples of which are illustrated in the accompanying drawings.

The present invention is to improve a data transmission efficiency using a ternary data level. Three binary data can be expressed by eight cases while two ternary data can be expressed by nine different cases. Thus, the three binary data can be converted to the two ternary data. Accordingly, the data transmission efficiency can be improved to about 50% by converting the binary data to the ternary data.

For converting data, when three binary data and the two ternary data are sequentially combined, nine combinations are possible. When the data are non-sequentially combined, the number of cases are $_9C_8=9!$, which is 362,880.

Figure 5:
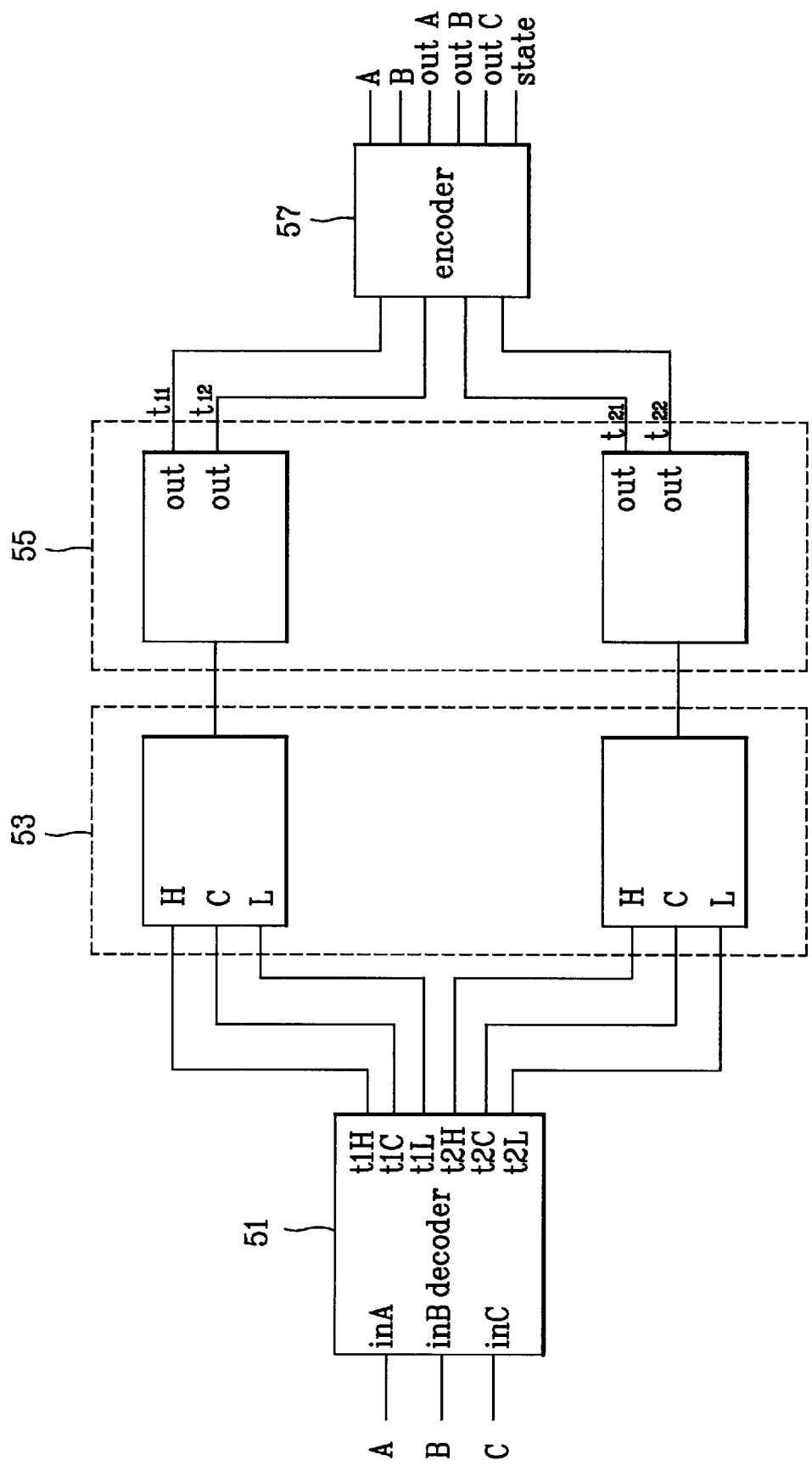
FIG. 5 is a block diagram illustrating a data transmission device according to a preferred embodiment of the present invention.

FIG. 5 is a block diagram illustrating a data transmission device according to the present invention. The data transmission device includes a decoder 51, a ternary data generator 53, a ternary data detector 55, and an encoder 57. Specifically, the decoder 51 is for outputting data t1L, t1C and t1H, and t2L, t2C and t2H from three input data A, B, and C to form ternary data. The ternary data generator 53 generates ternary data from the output signals from the decoder 51. The ternary data detector 55 is to detect the ternary data and output the same to OUTt11, OUTt12, OUTt21 and OUTt22. The encoder 57 converts the ternary data outputted from the ternary data detector 55 back to the binary data.

Figure 6:
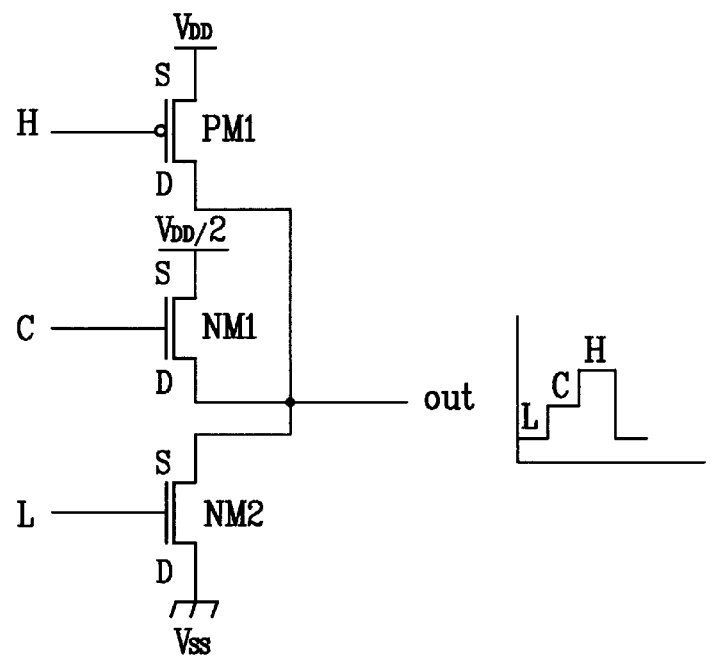
FIG. 6 is a circuit diagram illustrating a ternary data generator of FIG. 5 according to the present invention.

FIG. 6 illustrates a detailed circuit diagram to further describe the ternary data generator 53. As shown in FIG. 6, the ternary data generator 53 includes a PMOS PM1 for transmitting a power source voltage $V_{DD}$, an NMOS NM1 for transmitting an half of the power source voltage $V_{DD}/2$, and an NMOS NM2 for transmitting a ground voltage $V_{SS}$.

The PM1 and the NM1 should be turned off and the NM2 should be saturated in order to output the ground voltage $V_{SS}$. Thus, gate input signals of the PM1 and the NM1 become high H and low L, respectively. A gate input signal of the NM2 becomes low L.

Similarly, to output an half of the power source voltage $V_{DD}/2$, gate input signals of the NM1, PM1, and NM2 become H, H, and L, respectively, because only the NM1 should be saturated and the PM1 while the NM2 should be turned off. Furthermore, to output the power source voltage $V_{DD}$, since only the PM1 should be saturated while the NM1 and NM2 should be turned off, their gate input signals become L, L and L, respectively. When the ternary data generator 53 outputs ternary data, the ternary data detector 55 outputs OUTt1 and OUTt2. The ternary data detector 55 will be described with reference to FIG. 7 as follows.

Figure 7:
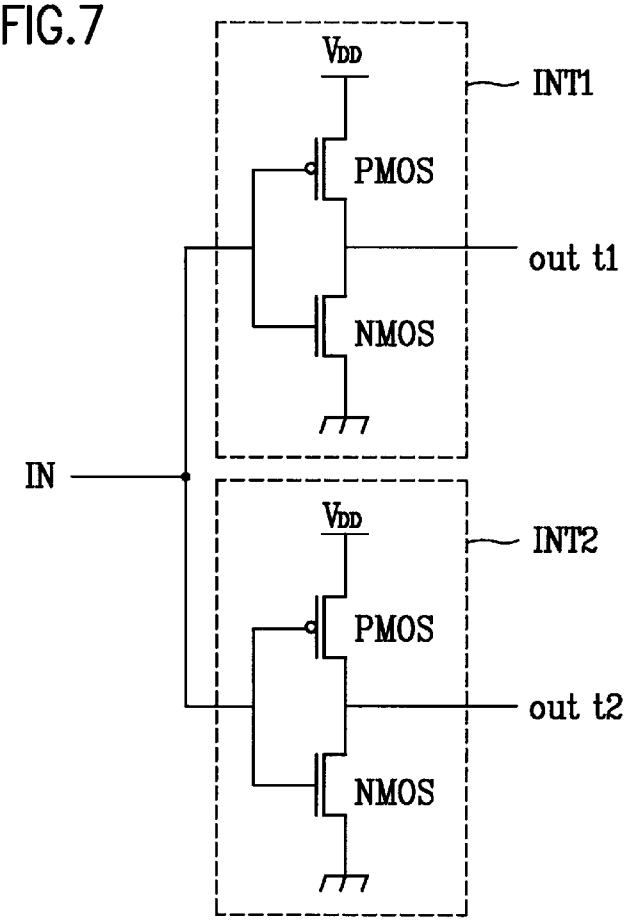
FIG. 7 is a circuit diagram illustrating a ternary data detector of FIG. 5 according to the present invention.

As shown in FIG. 7, the ternary data detector 55 includes two inverters INT1 and INT2 having a different ratio of PMOS and NMOS. When one of the inverters INT1 and INT2 has the PMOS greater than the NMOS, its output is changed with a voltage where an input voltage is lower than 2.5 V. Conversely, one of the inverters INT1 and INT2 has the NMOS greater than the PMOS, its output is changed with a voltage where the input voltage is higher than 2.5 V.

For example, when the input voltage is 0 to 1 V, the output values of the inverters INT1 and INT2 become high. When the input voltage is 2 to 3 V, the inverter having the PMOS greater than the NMOS becomes low whereas the inverter having the NMOS greater than the PMOS becomes high. Further, when the input voltage is 4 to 5 V, the output values of the inverters INT1 and INT2 become low. Consequently, three levels can be detected depending on the input voltages. The output values depending on the input voltages are summarized in a table of FIG. 8.

Figure 9:
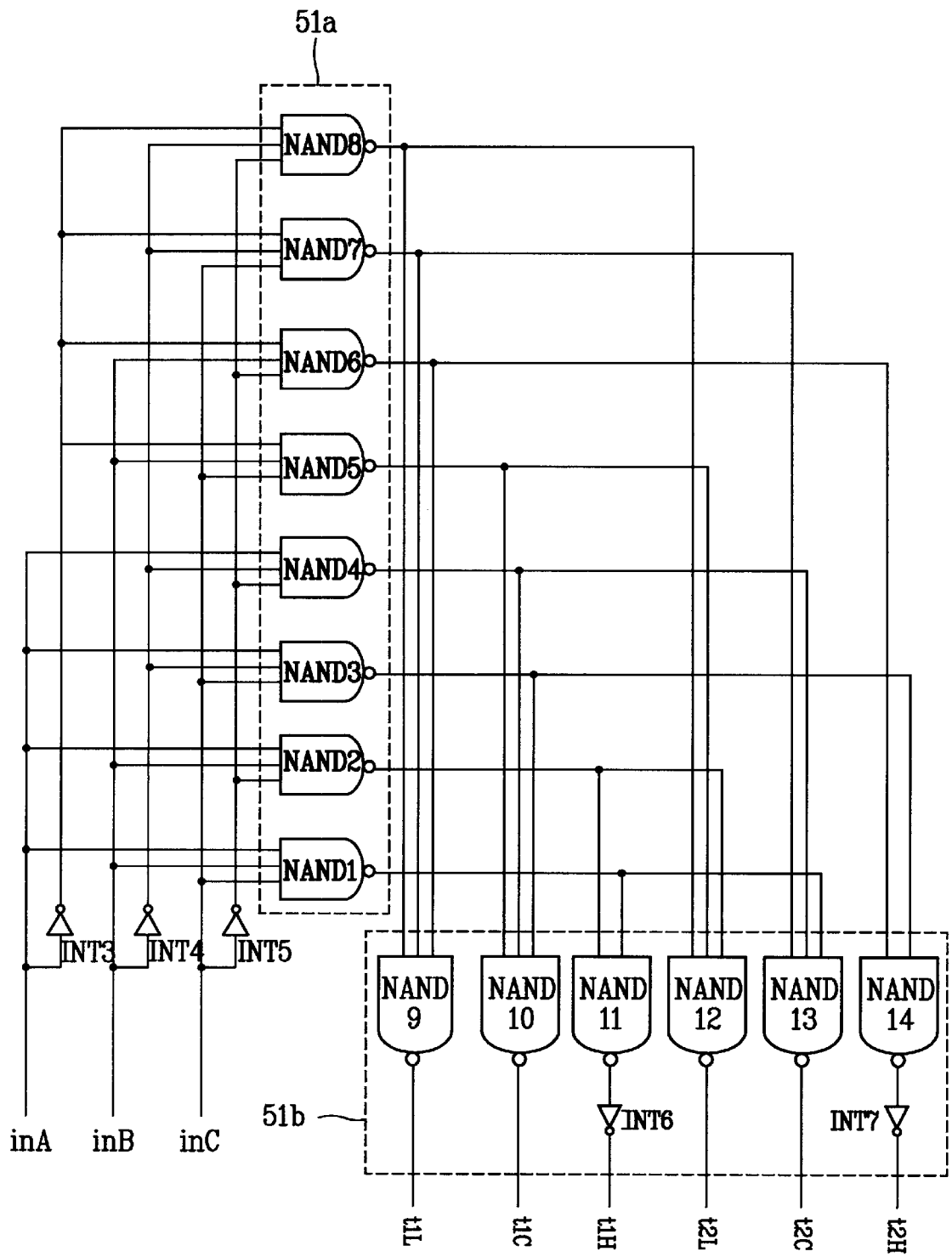
FIG. 9 is a circuit diagram illustrating a decoder of FIG. 5 according to the present invention.
Figure 10:
FIG. 10 is a logic table of the decoder of FIG. 9 according to the present invention.

FIG. 9 is a circuit diagram of a decoder 51 of FIG. 5 according to the present invention. The decoder 51 converts an input data to the corresponding ternary data as shown in a table of FIG. 10.

In FIG. 9, the decoder of the present invention includes inverters INT3, INT4 and INT5 connected to respective input terminals inA, inB, and inC for inverting input signals, a level converting portion 51a for converting levels of the input signals by selectively combining the input signals with output signals from the inverters, and a level output portion 51b for outputting the output values from the level converting portion 51a to the ternary data generator (not shown in FIG. 9) after selectively combining the output values from the level converting portion 51a. The level converting portion 51a includes eight logic gates having three input signals inA, inB, and inC. Input signals to respective eight logic gates are described as follows.

The three input signals inA, inB, and inC are inputted to a first NAND gate of eight NAND gates. The input signals inA and inB, and an inverse signal of the input signal inC are inputted to a second NAND gate. The input signals inA and inC and an inverse signal of the input signal inB are inputted to a third NAND gate. The input signal inA and the inverse signals of the input signals inB and inC are inputted to a fourth NAND gate. An inverse signal of the input signal inA and the input signals inB and inC are inputted to a fifth NAND gate. The inverse signals of the input signal inA and inC and the input signal inB are inputted to a sixth NAND gate. Inverse signals of the input signals inA and inB and the input signal inC are inputted to a seventh NAND gate. The inverse signals of the input signals inA, inB, and inC are inputted to an eighth NAND gate.

Meanwhile, the level output portion 51b includes six NAND gates. The output signals from sixth, seventh and eighth NAND gates of the level converting portion 51b are inputted to a ninth NAND gate NAND9. The output signals from the third, fourth, and fifth NAND gates of the level converting portion 51b are inputted to a tenth NAND gate NAND10. The output signals from the first and second NAND gates of the level converting portion 51b are inputted to an eleventh NAND gate NAND11. The output signals from the second, fifth, and eighth NAND gates of the level converting portion 51b are inputted to the twelfth NAND gate NAND12. The output signals from the first, fourth, and seventh NAND gates of the level converting portion 51b are inputted to a thirteenth NAND gate NAND13. The output signals from the third and sixth NAND gates of the level converting portion 51b are inputted to a fourteenth NAND gate NAND14.

The ninth and twelfth NAND gates NAND9 and NAND12 output low signals while the tenth and thirteenth NAND gates NAND10 and NAND13 output intermediate signals. The eleventh and fourteenth NAND gates NAND11 and NAND14 output high signals. Inverters INT6 and INT7 are connected to the respective output terminals of the eleventh and fourteenth NAND gates NAND11 and NAND14.

Figure 11:
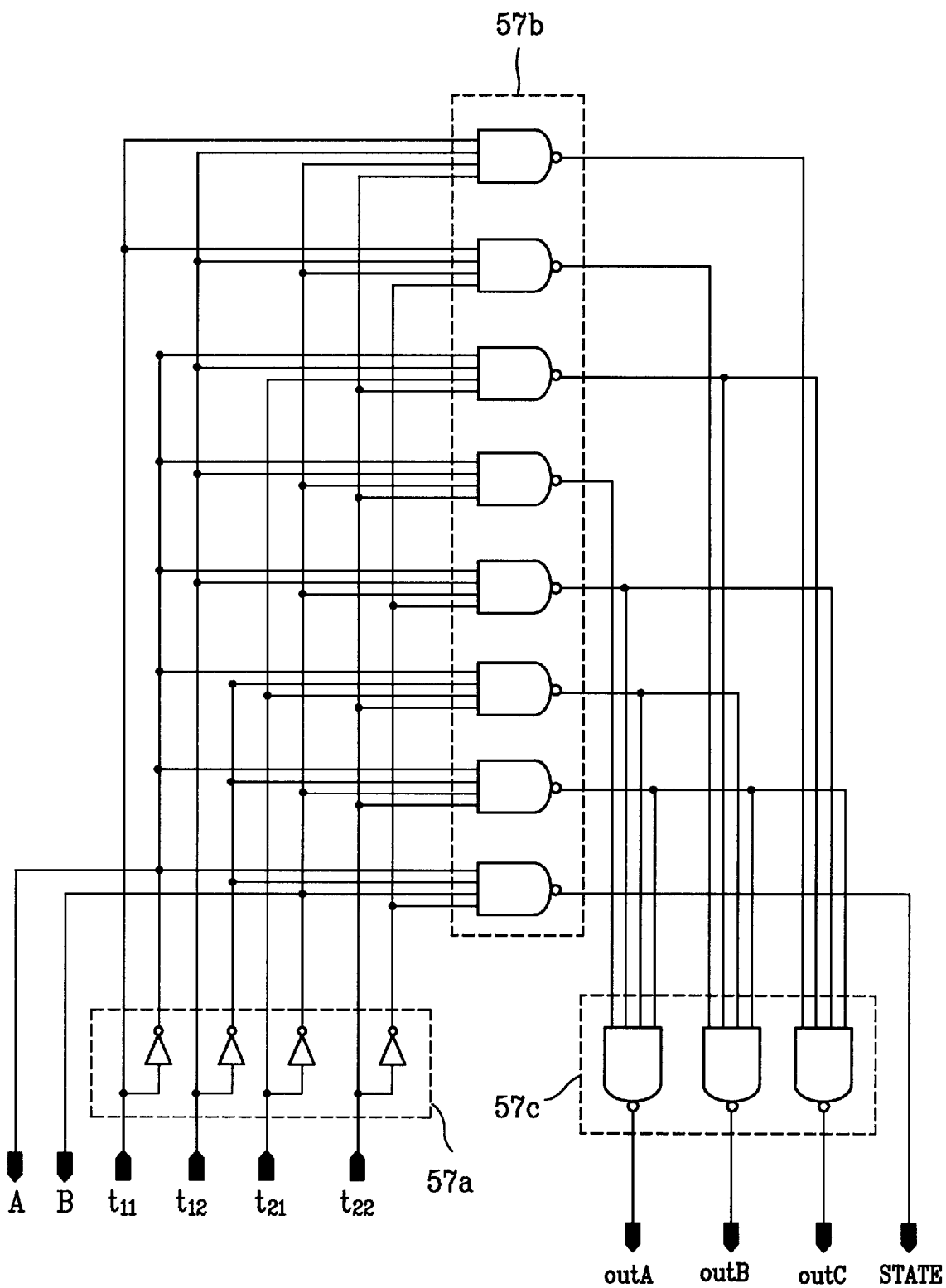
FIG. 11 is a circuit diagram illustrating an encoder of FIG. 5 according to the present invention.

The decoder 51 converts three binary data to generate a ternary data to the ternary data generator 53. The ternary data generator 53 generates ternary data H, L, and C through the data tl1, t1C and t1H, and t2L, t2C and t2H from the decoder 51 to output the signals to the ternary data detector 55. The ternary data detector 55 converts the ternary data H, C, and L from the ternary data generator 53 to pairs of binary data t11, t12, and t21, t22 as shown in the table of The encoder 57 will be further described with reference to FIG. 11. As shown in FIG. 11, the encoder 57 includes an inverter portion 57a for inverting the pairs of binary data from the ternary data detector 55, a data converting portion 57b for selectively combining the output signals of the ternary data generator 53, the output signals of the ternary data detector 55, and the output signals of the inverter portion 57a, and a data output portion 57c for outputting binary data by selectively combining the output signal of the data converting portion 57b.

The state terminal STATE of FIG. 11 detects a transmission error when the output values of the ternary data detector 55 are all "0". Thus, when the output values of the ternary data detector 55 are all "0", no signal is detected at the state terminal STATE because the transmitted data are HH.

An LCD device employing a data transmission device of the present invention will be described with reference to FIG. 12 as follows.

Figure 1:
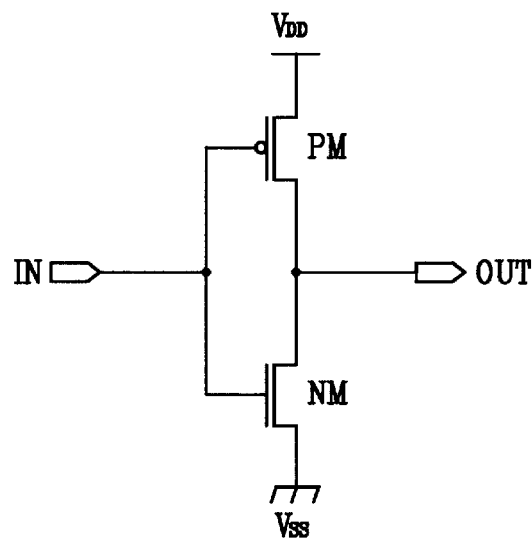
FIG. 1 is a circuit diagram illustrating a background art CMOS transistor.
Figure 2:
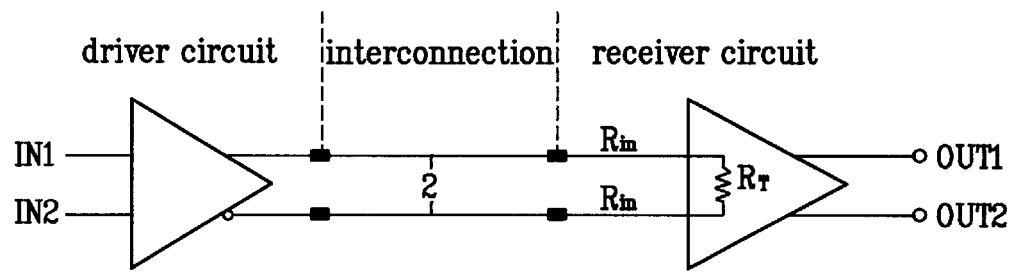
FIG. 2 is a circuit diagram utilizing a background art low voltage differential clock signal (LVDS)
Figure 3:
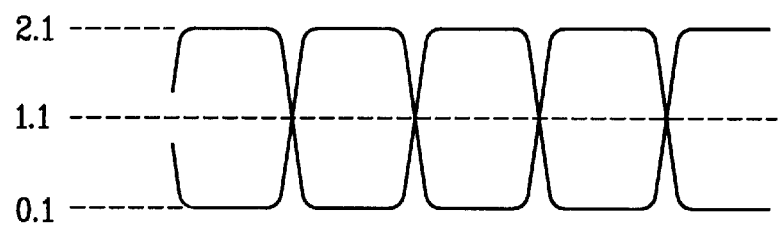
FIG. 3 is a waveform of transmission data in FIG. 2.
Figure 4:
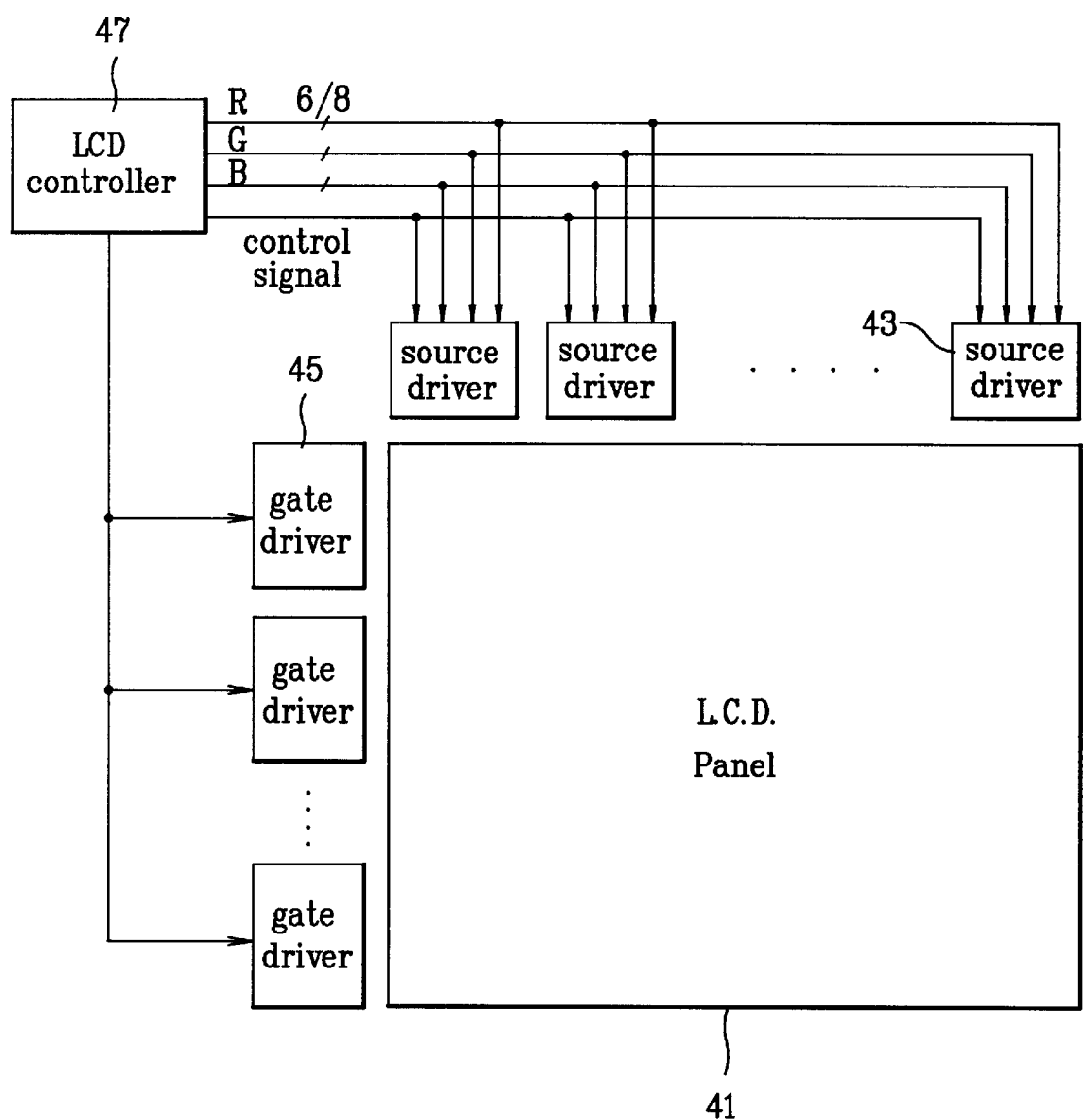
FIG. 4 is a block diagram illustrating a background art liquid crystal display device.
Figure 12:
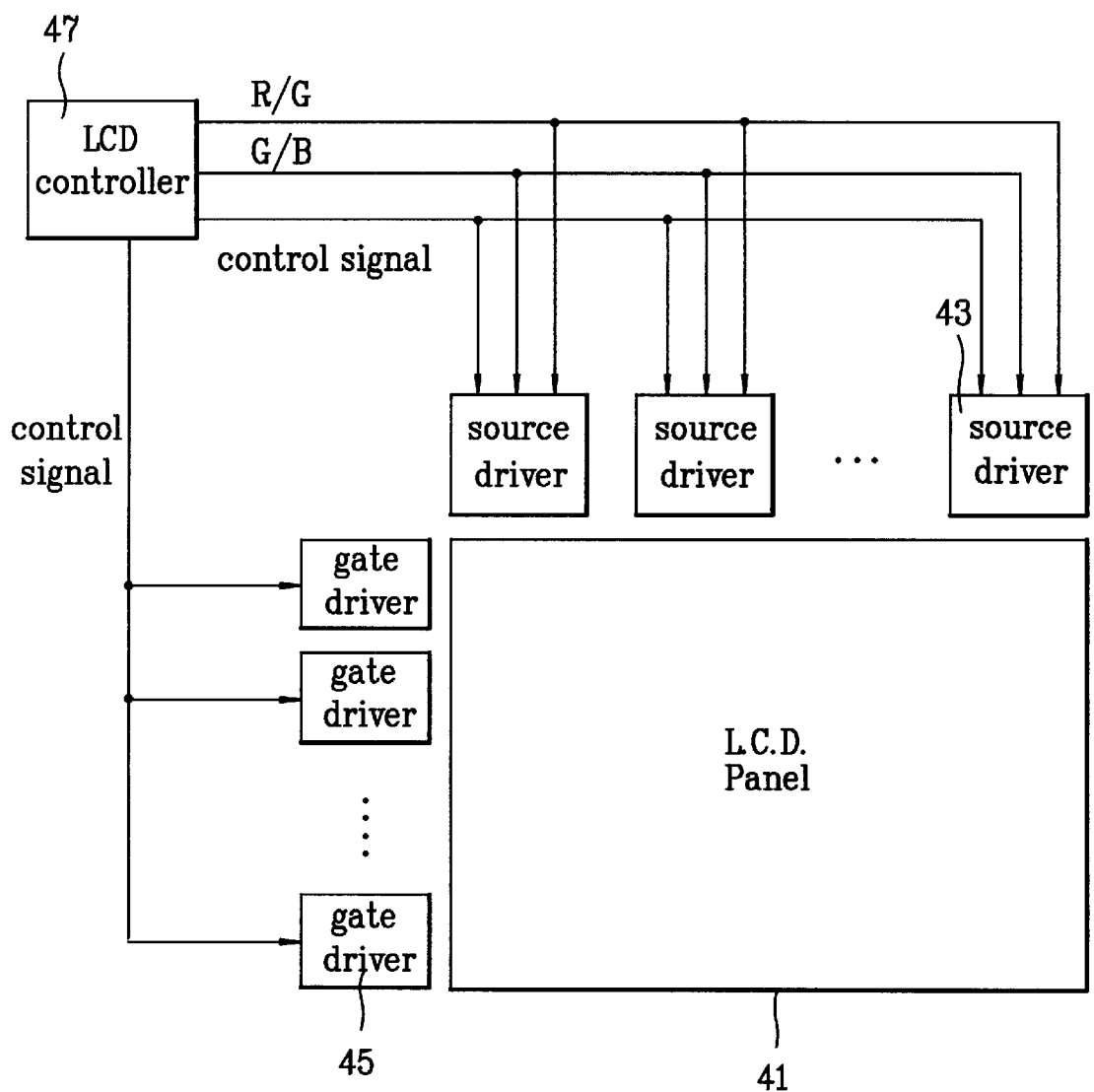
FIG. 12 is a block diagram illustrating a liquid crystal display device employed to the data transmission device according to the present invention.

A configuration of FIG. 12 is similar to that of FIG. 4. It is, however, different from that of FIG. 4 because the number of transmission lines for a data transmission to the source drivers 43 from the controller 47 is remarkably reduced. Since the data transmission device of the present invention reduces the number of the transmission lines as much as ⅓, only 12 to 16 transmission lines are needed even if the R, G, B data in two channels are transmitted simultaneously.

As shown in FIG. 12, the liquid crystal display device using the data transmission device of the present invention reduces the number of the data transmission line as much as ⅓ as compared to the conventional data transmission device. By reducing the data transmission line, the number of pin in the LCD controller 47 and the number of input pin in the source drivers 43 are much reduced.

Accordingly, the data transmission device of the present invention has the following advantages.

When determining the input signal by means of the binary data, a power consumption is reduced because data "1" is recognized even at 2 to 3 V as the same as 5 V.

In addition, since the data transmission device of the present invention processes both the binary data and the ternary data, a compatibility with the conventional circuit is also improved.

Further, when the data transmission device of the present invention is applied to the LCD device, the number of the data transmission lines between the LCD controller and the source driver is much reduced, thereby reducing a power consumption. Consequently, it reduces an electro magnetic interference in the LCD module.

It will be apparent to those skilled in the art that various modifications and variations can be made in the data transmission device for the liquid crystal display device according to the present invention without departing from the spirit or scope of the invention. Thus, it is intended that the present invention covers the modifications and variations of the invention provided they come within the scope of the appended claims and their equivalents.

What is claimed is:

1. A data transmission device, comprising:
   a decoder converting a first binary data to a ternary data;
   a ternary data generator coupled to the decoder and generating one pair of logic levels corresponding to the ternary data, a power source voltage, an intermediate voltage, and a ground voltage, the intermediate voltage having a voltage level between the power source voltage and the ground voltage;
   a ternary data detector coupled to the ternary data generator and converting the one pair of logic levels from the ternary data generator to pairs of second binary data, wherein the ternary data detector comprises first and second inverters, each inverter comprising a PMOS and a NMOS, wherein a channel width/length ratio of the PMOS is different than a channel width/length ratio of the NMOS; and an encoder coupled to the ternary data detector and restoring the pairs of second binary data to the first binary data.

2. The data transmission device according to claim 1, wherein the decoder comprises:

first, second, and third inverters respectively connected to first, second, and third input terminals of the decoder, and inverting input signals;

a level converting portion coupled to the first, second, and third inverters and converting levels of the input signals by selectively combining input signals from the input terminals with output signals from the inverters; and a level output portion coupled to the level converting portion and outputting signals to the ternary data generator after selectively combining output signals from the level converting portion.

3. The data transmission device according to claim 2, wherein the level converting portion comprises a plurality of NAND gates for selectively combining input signals and inverse input signals to output signals to the level output portion.

4. The data transmission device according to claim 2, wherein the level output portion comprises a plurality of NAND gates and inverters for selectively combining output signals from the level converting portion.

5. The data transmission device as claimed in claim 1, wherein the ternary data generator comprises:

a PMOS having a source connected to the power source voltage and controlled by a gate input signal of the PMOS;

a first NMOS having a source connected to an half of the power source voltage and a drain commonly connected to a drain of the PMOS controlled by a gate input signal of the first NMOS; and a second NMOS having a source connected to the ground voltage and a drain commonly connected to a drain of the PMOS and an output terminal controlled by a gate input signal of the second NMOS.

6. The data transmission device according to claim 5, wherein the ternary data generator has output signals of one pair of logic levels depending on each gate input signal from the decoder.

7. The data transmission device according to claim 1, wherein the encoder comprises:

an inverter portion inverting the pairs of the second binary data;

a data converting portion coupled to the inverter portion and selectively combining input signals from the ternary data detector and the inverter portion to output converted signals; and a data output portion receiving the converted signals from the data converting portion and outputting signals.

8. The data transmission device according to claim 7, further comprising a state pin detecting a transmission state of the pairs of second binary date outputted from the ternary data detector.

9. The data transmission device according to claim 8, wherein the state pin determines whether the transmission state of the pairs of second binary data is in error when output signals from the ternary data detector are all "0".

10. The data transmission device according to claim 1, wherein both the first and second inverters output high signals when input signals are 0 to 1 V.

11. The data transmission device according to claim 1, wherein one of the first and second inverters having a channel width/length ratio of the PMOS greater than the channel width/length ratio of the NMOS outputs a low signal when input signals are 2 to 3 V.

12. The data transmission device according to claim 1, wherein both the first and second inverters output low signals when input signals are 4 to 5 V.

* * * * *